US010626718B2

(12) United States Patent
Jaaskelainen et al.

(10) Patent No.: US 10,626,718 B2
(45) Date of Patent: Apr. 21, 2020

(54) MODULAR ELECTRO-OPTIC FLOWMETER SYSTEM FOR DOWNHOLE

(71) Applicant: Halliburton Energy Services, Inc., Houston, TX (US)

(72) Inventors: Mikko Jaaskelainen, Katy, TX (US); Brian Park, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 113 days.

(21) Appl. No.: 15/765,210

(22) PCT Filed: Dec. 16, 2015

(86) PCT No.: PCT/US2015/065947
§ 371 (c)(1),
(2) Date: Mar. 30, 2018

(87) PCT Pub. No.: WO2017/105420
PCT Pub. Date: Jun. 22, 2017

(65) Prior Publication Data
US 2018/0266240 A1 Sep. 20, 2018

(51) Int. Cl.
*E21B 47/10* (2012.01)
*E21B 49/08* (2006.01)
*E21B 41/00* (2006.01)
*E21B 47/06* (2012.01)
*G01F 1/32* (2006.01)
*G01F 15/18* (2006.01)
(Continued)

(52) U.S. Cl.
CPC ........ *E21B 47/101* (2013.01); *E21B 41/0085* (2013.01); *E21B 47/06* (2013.01); *E21B 47/065* (2013.01); *E21B 47/10* (2013.01); *E21B 49/08* (2013.01); *G01F 1/3263* (2013.01); *G01F 15/18* (2013.01); *G01N 29/024* (2013.01); *G01N 29/223* (2013.01); *E21B 47/123* (2013.01); *E21B 2049/085* (2013.01)

(58) Field of Classification Search
CPC ........ E21B 47/00; E21B 47/06; E21B 47/065; E21B 47/101; E21B 49/00; E21B 49/003; G01F 1/3263; G01N 29/024; G01N 29/223; G01N 29/227
USPC ... 73/19.03, 152.19, 152.43, 152.46, 152.47, 73/152.58, 632, 645, 801
See application file for complete search history.

(56) References Cited

U.S. PATENT DOCUMENTS

2005/0230973 A1* 10/2005 Fripp ................. E21B 41/0085
290/1 R
2008/0048455 A1* 2/2008 Carney .................... F03D 5/00
290/54
(Continued)

OTHER PUBLICATIONS

PCT Application Serial No. PCT/US2015/065947, International Search Report, dated Aug. 19, 2016, 3 pages.
(Continued)

*Primary Examiner* — Benjamin R Schmitt
(74) *Attorney, Agent, or Firm* — Gilliam IP PLLC

(57) ABSTRACT

A modular sensor system using electro acoustic technology to measure downhole properties, such as flow rate, density and fluid fraction of oil in a production string, is described. Modular sensor assemblies inside a wellbore collect various local fluid parameters at each location. The local fluid parameters are combined to determine the downhole properties.

17 Claims, 5 Drawing Sheets

(51) Int. Cl.
*G01N 29/024* (2006.01)
*G01N 29/22* (2006.01)
*E21B 47/12* (2012.01)

(56) References Cited

U.S. PATENT DOCUMENTS

2011/0100642 A1  5/2011 Cens et al.
2013/0119669 A1* 5/2013 Murphree ............ H01L 41/125
                                                290/54

OTHER PUBLICATIONS

PCT Application Serial No. PCT/US2015/065947, International Written Opinion, dated Aug. 19, 2016, 10 pages.

* cited by examiner

MODULAR ELECTRO-OPTIC FLOWMETER SYSTEM FOR DOWNHOLE

BACKGROUND

The simultaneous flow of oil-gas-water mixtures in pipes is a common occurrence in the petroleum industry. This type of flow is found in producing wells. Most well fluids are composed of oil and gas but during the life of the well the water content can increase greatly. Research into this area has defined a number of different flow regimes for such mixtures. The need to measure downhole flow rate, density and fluid fractions of oil-gas-water mixtures in the production string has been fundamental for many years. The device described herein enables determining these parameters, along with ambient pressure and temperature, to be measured using a modular flowmeter based on vortex shedding, energy harvesting, electro acoustic Technology (EAT), molded mandrels and DAS optical telemetry. Numerous modules can be installed across a pay field so that local flow conditions in different regions can be determined. A device is described which provides: a means to harvest energy from downhole fluid flow based on Vortex Induced Vibration (VIV). The energy is converted to electricity that is used for powering very low power electronic sensing devices such as Electro Acoustical Technology (EAT) devices, which piggy back on fiber optic Distributed Acoustic System (DAS) telemetry for data transmission.

Energy harvesting is the process by which energy readily available from the environment is captured and converted into usable electrical energy. Historically, downhole electrical power has been either via electrical wiring from the surface, limited life batteries, or turbines powered by drilling mud for MWD. All of these methods were used for creating significant power downhole. The advent of nano powered sensors, ultralow power microprocessors and other minimal powered devices opens up a new era for downhole telemetry when combined with fiber optic data transmission. This promises perpetually powered sensors that use very small amounts of energy. What is needed is a method for downhole energy harvesting to power this new generation of electronics. The major sources of energy downhole are fluid flow, vibration, acoustics and heat. While the system described below is based on the conversion of fluid flow using piezo electrics, conversion can also be accomplished using vibrating cantilevers, accelerometers, induction coils and magnets, impellers and other means. There must be fluid flow for the vortex energy harvester to work. Where no flow is present, vibration, acoustics or heat transfer can be utilized. In some cases all three can be utilized together.

DETAILED DESCRIPTION

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

The detailed description to follow describes the use of electro acoustic technology to create multiple modular flow meters in downhole oil and gas systems. Electro acoustic technology (EAT) will be described first and then the use of EAT in creating modular flow meters.

Description of EAT (Electro Acoustic Technology) Sensors

The EAT sensors and EAT sensing technology described in this disclosure is a recently developed technology and has been described in a recently published PCT application: WO2015020642A1.

EAT Sensors represent a new approach to fiber optic sensing in which any number of downhole sensors, electronic or fiber optic based, can be utilized to make the basic parameter measurements, but all of the resulting information is converted at the measurement location into perturbations or a strain applied to an optical fiber that is connected to an interrogator that may be located at the surface of a downhole well. The interrogator may routinely fire optical signal pulses downhole into the optical fiber. As the pulses travel down the optical fiber back scattered light is generated and is received by the interrogator.

The perturbations or strains introduced to the optical fiber at the location of the various EAT sensors can alter the back propagation of light and those effected light propagations can then provide data with respect to the signal that generated the perturbations.

Figure 1:
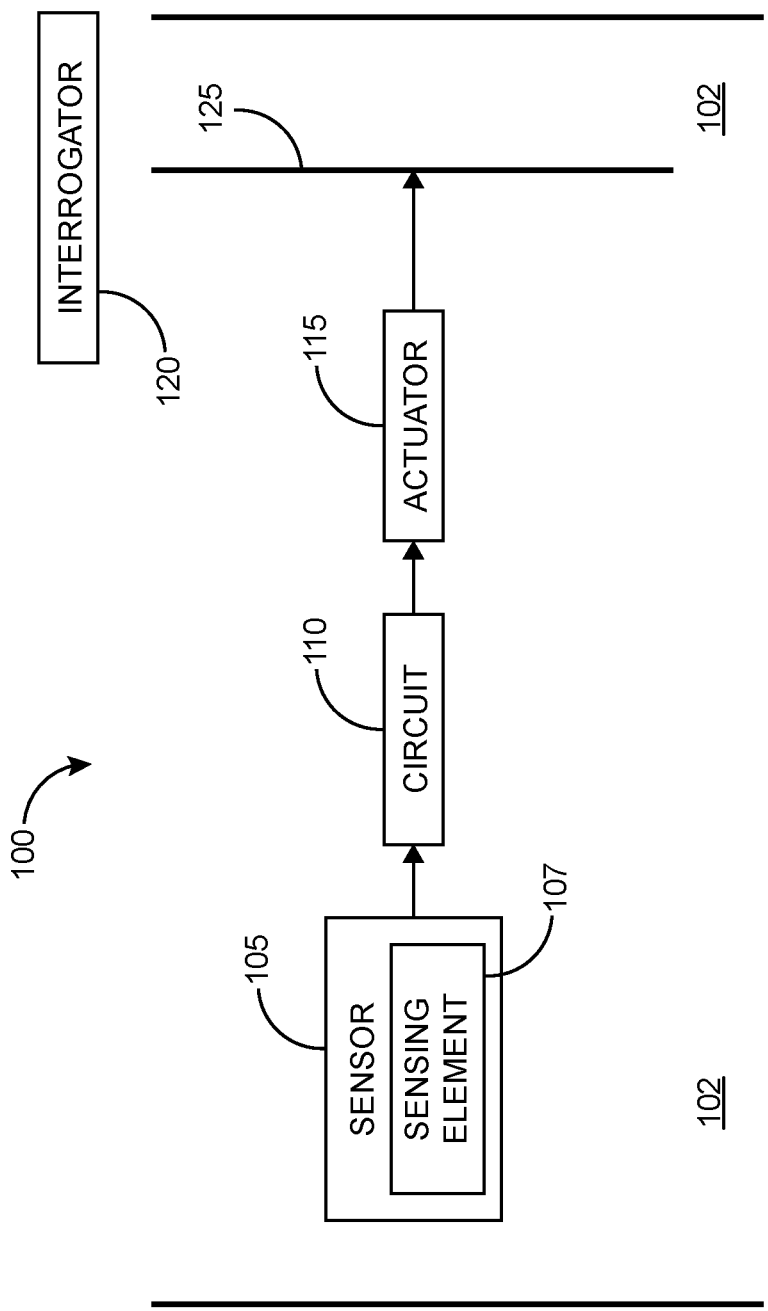
FIG. 1 illustrates the basic concept of electro acoustic technology.

The EAT sensor system can be best understood by reference to FIG. 1, which is an example embodiment of an EAT sensor system. System 100 can include a sensor 105, a circuit 110 coupled to the sensor 105, an actuator 115 coupled to the circuit 110, and an interrogator 120. The sensor 105 is operable to provide a measurement corresponding to a parameter at a location in a region 102. The sensor 105 can be realized in a number of different ways depending on the parameter to be determined by the measurement using the sensor 105. The parameter can include, but is not limited to, a chemical concentration, a pH, a temperature, a vibration, or a pressure. The sensor 105 has the capability of being disposed at a location in proximity of an optical fiber cable 125. The sensor 105 can be located downhole at a drilling site with the interrogator 120 at the surface of the drilling site. The drilling site may be terrestrial or sea-based. Components of the system 100 may be disposed outside casing in cement or strapped to a production tube in a permanent installation. Components of the system 100 also may be disposed in a coiled tube that can be pushed through into a horizontal area of operation, or a wire line cable that can be tractored into a wellbore using an electrically driven tractor that pulls the wire line cable into the wellbore, or pumped into a wellbore with fluid that push/pulls a cable into the wellbore. The system 100 may be used with other drilling related arrangements. The circuit 110, coupled to the sensor 105, can be structured to be operable to generate a signal correlated to the parameter in response to the measurement by the sensor 105. The circuit 110 may be integrated with the sensor 105. For example, a sensing element 107 may be an integral part of the circuit 110 or directly coupled to a component of the circuit 110. The sensing element 107 may be a diaphragm directly coupled to a component of the circuit 110.

The actuator 115 can be coupled to the circuit 110 to receive the signal generated in response to the measurement by the sensor 105. The signal can be a compensated signal, where a compensated signal is a signal having a characteristic that corresponds to the parameter of interest for which variations in one or more other parameters is substantially corrected or removed, or for which the characteristic is isolated to the parameter of interest. The actuator 115 can be integrated with the circuit 110, integrated with the circuit 110 that is integrated with the sensor 105, or a separate structure coupled to the circuit 110.

The actuator 115 can be structured to be operable to generate a perturbation, based on the signal, to an optical fiber cable 125, that may include one or multiple optical fibers. The actuator 115 can be positioned in proximity to the optical fiber cable 125 at the effective location of the sensor 105. The actuator 115 can be structured to be operable to generate the perturbation to the optical fiber cable 125 with the actuator 115 in contact with the optical fiber cable 125. The actuator 115 can be structured to be operable to generate the perturbation to the optical fiber cable 125 with the actuator 115 a distance from the optical fiber cable 125. The actuator 115 may be realized as a non-contact piezoelectric material, which can provide acoustic pressure to the optical fiber cable 125 rather than transferring vibrations by direct contact.

The optical fiber cable 125 can be perturbed with the optical fiber cable 125 in direct contact with the actuator 115 structured as a vibrator or with the actuator 115 structured having a form of voice coil at a distance away from the optical fiber cable 125. The perturbation of the optical fiber can be provided as a vibration of the optical fiber cable 125 or a strain induced into the optical fiber cable 125. Other perturbations may be applied such that the characteristics of the optical fiber are altered sufficiently to affect propagation of light in the optical fiber cable 125. With the effects on the light propagation related to a signal that generates the perturbation, analysis of the effected light propagation can provide data with respect to the signal that generates the perturbation.

The interrogator 120 can be structured to interrogate the optical fiber cable 125 to analyze signals propagating in the optical fiber cable 125. The interrogator 120 can have the capability to couple to the optical fiber cable 125 to receive an optical signal including the effects from the perturbation of the optical fiber cable 125 and to extract a value of the parameter of the measurement in response to receiving the optical signal from the perturbation. In an embodiment, the received signal may be a backscattered optical signal. The interrogator 120 may be structured, for example, to inject a short pulse into the optical fiber cable 125. An example of a short pulse can include a pulse of 20 nanoseconds long. As the pulse travels down the optical fiber cable 125, backscattered light is generated. Interrogating a location that is one kilometer down the fiber, backscattered light is received after the amount of time it takes to travel one kilometer and then come back one kilometer, which is a round trip time of about ten nanoseconds per meter. The interrogator 120 can include an interferometric arrangement. The interrogator 120 can be structured to measure frequency based on coherent Rayleigh scattering using interferometry, to measure dynamic changes in attenuation, to measure a dynamic shift of Brillouin frequency, or combinations thereof.

The interrogator 120 can be arranged with the optical fiber cable 125 to use an optical signal provided to the interrogator 120 from perturbing the optical fiber cable 125 at a location along the optical fiber cable 125. An arrangement different from using an optical signal backscattered from the perturbation can be utilized. For example, the optical fiber cable 125 can be structured having an arrangement selected from a fiber Bragg grating disposed in the optical fiber in vicinity of the actuator for direct wavelength detection based acoustic sensing, a non-wavelength selective in-line mirror disposed in the optical fiber in vicinity of the actuator, intrinsic Fabry-Perot interferometers as a mode of interrogation from fiber Bragg gratings placed apart in the optical fiber such that each fiber Bragg grating Fabry-Perot cavity is in vicinity of a respective actuator, Fizeau sensors in the optical fiber, a second optical fiber to transmit an optical signal from a perturbation of the optical fiber to a detection unit of the interrogator, or other arrangements to propagate a signal, representative of a measurement, in an optical fiber to an interrogation unit to analyze the signal to extract a value of a parameter that is the subject of the measurement.

The possible advantages from using the above described EAT systems in a variety of configurations may include using a variety of sensors, either electrical or fiber optic based, to measure for example a chemical concentration, a pH, a temperature, or a pressure and using a common optical fiber connected to a surface interrogator to measure perturbation signals from each EAT sensor location distributed along that common optical fiber and analyzing those signals to extract values of the parameters being measured. The approach can significantly reduce manufacturing complexity, reduce very expensive labor intensive production with expensive equipment like splicers and fiber winders, improve reliability, and widen industry acceptance by allowing the use of sensing technologies of choice.

Figure 2:
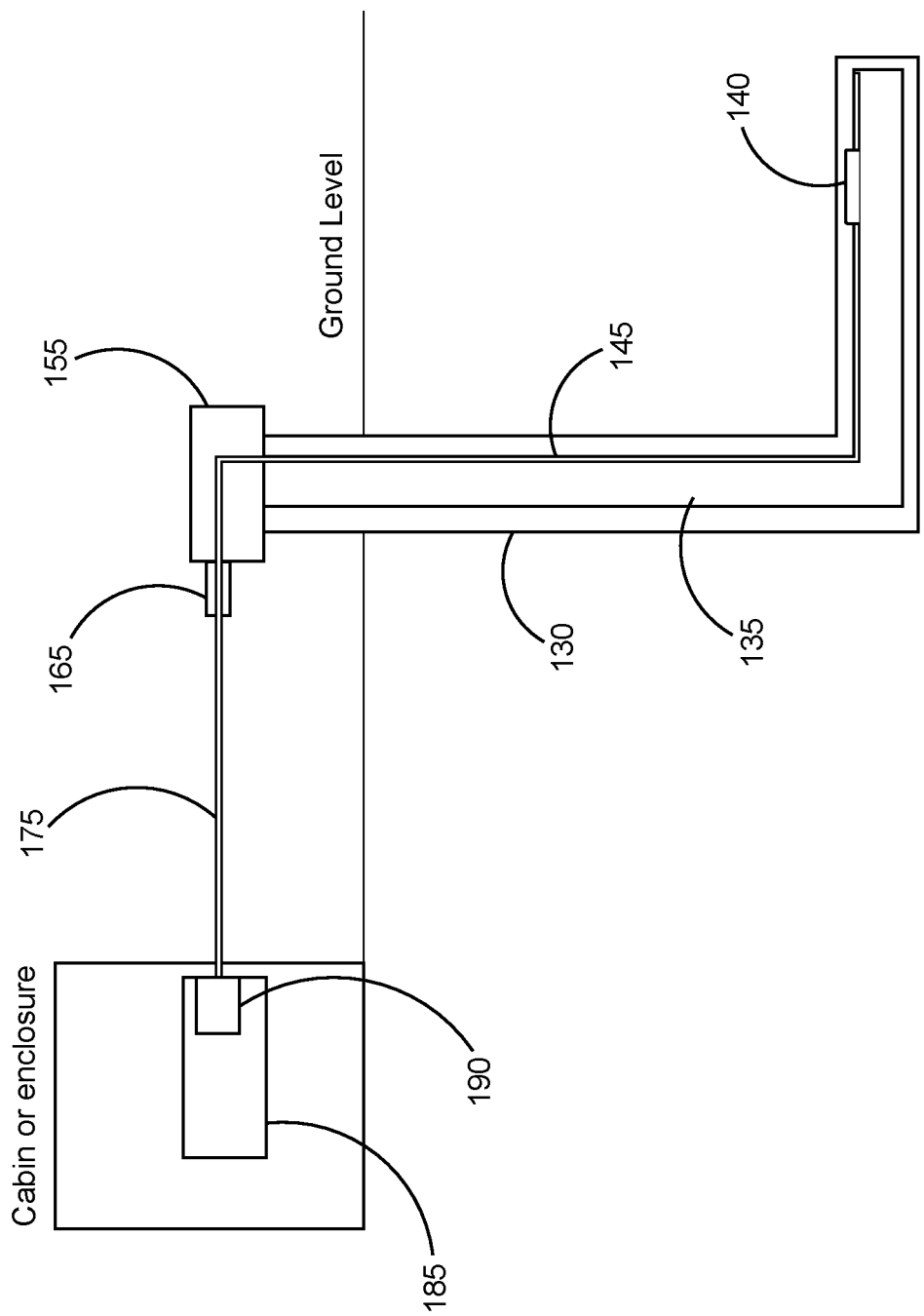
FIG. 2 illustrates a more complete system for utilizing electro acoustic technology in a subsurface well.

FIG. 2 expands on the use of electro acoustic technology (EAT) sensing systems by illustrating a more complete system. A subsurface well 130 is illustrated, in which a production casing 135 is shown extending through the well. In some applications the production casing may be non-metallic. At the far downhole end of the well an electro acoustic technology sensor assembly 140 is shown. In this example it is shown on the outside of the casing. In some applications the EAT sensor assembly could be within the casing. In many applications there could be multiple EAT sensor assemblies and the technology can easily accommodate that. In close proximity to the EAT sensor assembly shown is a fiber optic cable 145 that is deployed all through the well and back to the surface, then through a wellhead 155. The fiber optic cable 145 may be clamped to the EAT sensor assembly 140 to ensure good transmission of signals. The fiber optic cable 145 exits through a wellhead exit 165 and is connected using a surface fiber cable 175 within an outdoor cabin or enclosure to a Distributed Acoustic System (DAS) interrogator 185. The interrogator may then have a laser source 190 that fires interrogation pulses down through the fiber optic cable and receives backscattered light back from the fiber optic cable.

The fiber optic cable 145 may be permanently installed, or in some applications could be attached to some type of logging cable such as wireline or slickline cables. It could also be clamped on tubing inside the casing 135 in some applications.

Modular Flow Meters

Figure 3:
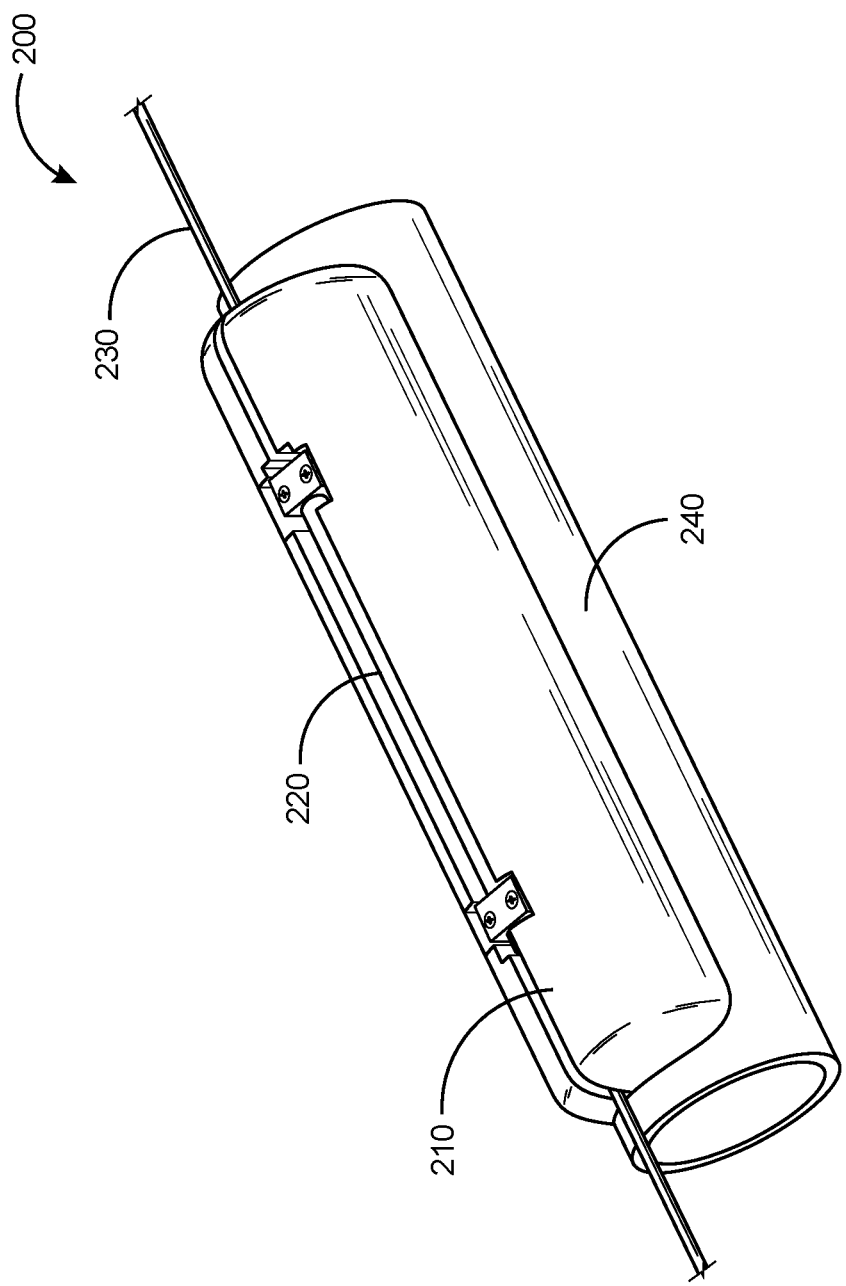
FIG. 3 illustrates an embodiment of a modular flow meter using electro acoustic technology.

FIG. 3, shown generally as the numeral 200, illustrates a modular flow meter. The device consists of a short length of casing 240, less than 3 feet in length, (may need to include length for tongs to hold the pup joint and threads etc.) to which is mounted an EAT sensor 220 and a DAS fiber line 230. The EAT sensor is protected by a molded mandrel 210.

The disclosure for downhole use presented herein uses the well-known phenomena of vortex induced vibration (VIV) to create mechanical energy that is harnessed using piezo electric crystals to convert the energy to electrical energy via a commercially available energy harvesting chip or to measure fluid flow. A vortex energy harvester and flow measuring device comprises a small cylindrical shaped projection into the fluid flow that encloses one or more piezo electric crystals. As fluid flows against and around the cylinder vortexes are created which creates vibrations in the cylinder. The vibration is converted to electricity and used to power devices downhole. By monitoring the input voltage from the piezo the frequency of vibration can be determined for flow calculations. While the amount of energy is relatively small, it is sufficient to power sensor electronics and/or charge batteries downhole without electrical connection to the surface. This is useful for Electro acoustic technology (EAT) where data is transmitted to the surface using optical fiber and Distributed Acoustic Sensing (DAS) techniques. It can also be used for other downhole or subsea applications that require electrical power without electrical connections to the surface. The measurement of the vibration frequency can also be used to determine the velocity of the fluid and hence the flow rate. Thus the device has dual use as an energy harvester and as a flow meter, which is of considerable interest for downhole measurement.

Figure 4:
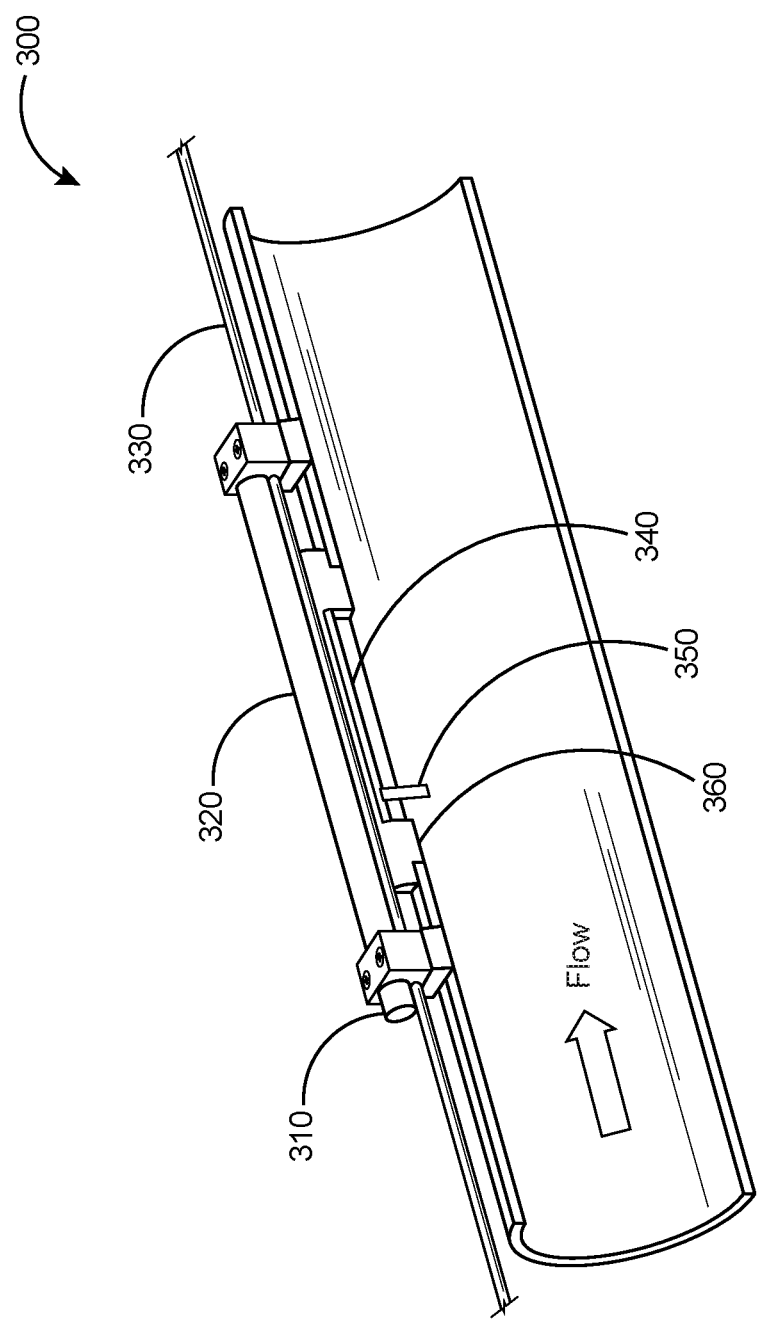
FIG. 4 illustrates a cross sectional view of the modular flow meter of FIG. 3.

In FIG. 4, represented general by the numeral 300, the molded part of the mandrel is removed, and the device sectioned to show the interior of the flow sensing system. A recess 340 is machined into a welded fixture attached to the collar. When flow passes over the recess, turbulence is created at the transition. The turbulence causes a vortex energy harvester and velocity sensor 350 comprising a circular cylinder with one or more internal piezo electric crystals that will vibrate at a frequency related to the flow rate. The vibration can be used to charge a battery in the EAT, and its frequency can be used to determine the velocity of the fluid. In addition sensors 360 in the welded fixture measure temperature and pressure. This information is transferred to the DAS fiber using a piezo electric transmitter 310. Each sensor assembly transmits at a different frequency, which can be detected by the DAS interrogator and decoded at the surface.

Vortex induced vibrations are motions induced on bodies interacting with an external fluid flow produced by periodical irregularities on this flow. For a circular cylinder (such as the vortex harvester 350) perpendicular to the flow, the streamlines around the cylinder are symmetrical at low Reynolds numbers. As the flow, and so the Reynolds number, increases, the flow becomes asymmetric and a Karman vortex street forms, a repeating pattern of swirling vortices caused by unsteady separation of flow around the blunt body. This creates periodical lateral forces on the cylinder, causing it to vibrate, compressing and extending the piezo electric crystals. This creates a voltage in the piezo electric crystals, which is used to charge a battery or power a sensor, or the frequency of the resulting voltage can be calibrated to measure a flow rate.

Like many fluid flow phenomena, vortex shedding has been observed to be directly dependent on the Reynolds number of the flow. Experiments have shown that for Reynolds numbers between 300 and 300,000 the vortex street caused by a cylinder is fully turbulent. The Reynolds number is directly proportional to the free stream velocity of the fluid and the cylinder diameter, and inversely proportional to the kinematic viscosity of the fluid. For example, a velocity of 0.35 m/s with a cylinder diameter of 4 mm, and a kinematic viscosity of 10 centipoise (cP), gives an R number of 1400, which is well in the range of the vortex street. Since crude oil has a wide range of kinematic viscosity, the diameter of the harvester must be selected to ensure that turbulence occurs over the expected velocity range.

Multiple Modular Flow Meters

Figure 5:
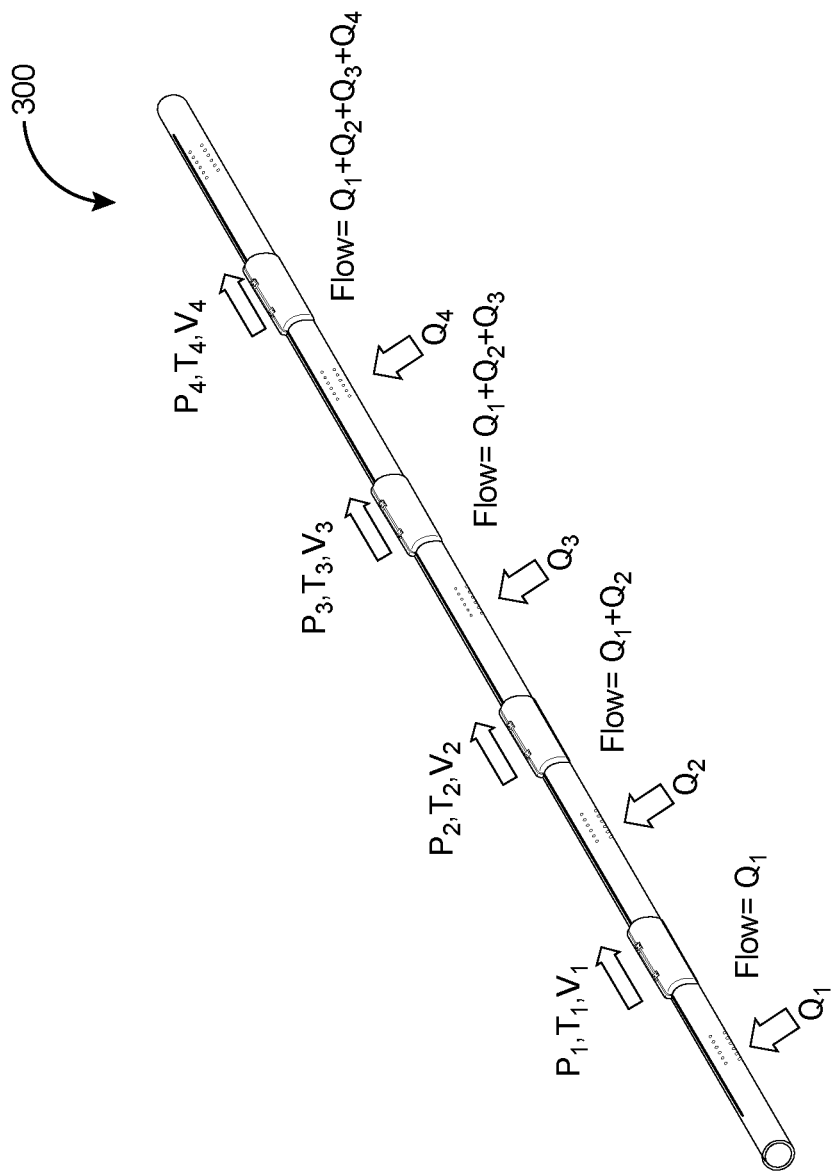
FIG. 5 illustrates an example of a downhole installation of multiple modular flow meters

FIG. 5 shows a series of flow meters located between collars. The length of the collars matches the pay zones of the formation and can be of any length. There may be packers and other production components in the string as well. Fluid from the formation pay zones (oil, gas, water) enters the collars and flows to the surface. The illustration shows 4 pay zones in which flows Q1, Q2, Q3, and Q4 are entering. The modular flow meters, which measure pressure P, temperature T, and fluid velocity V for each meter are able to determine the flow rate, density and oil-gas-water fraction from each zone using well established methods of calculation.

As discussed previously, the simultaneous flow of oil-gas-water mixtures in pipes is a common occurrence in the petroleum industry. This type of flow is found in producing wells. Most well fluids are composed of oil and gas but during the life of the well the water content can increase greatly. Research into this area has defined a number of different flow regimes for such mixtures.

Bulk volumetric flow can be determined by measuring amplitude and frequency content of the electrical signal from the power-harvesting device.

Density can be measured using multiple pressure sensors in deviated wells.

Pressure and temperature can be used to estimate flow regime. Distributed Acoustic Sensing (DAS) may also be used to determine flow regime, and also how the flow regime evolves along the well bore. The flow regime may change as temperature and pressure change along the well bore, and the fluid composition may change as various inflow points may contribute different fluids.

This information can also be used in combination with the gas fraction information to understand and constrain the final multiphase solution.

Gas fraction can be estimated by measuring the acoustic velocity in the fluid. The acoustic velocity may be measured between modules as one module may transmit while another module may receive or vice versa. Distributed Acoustic Sensing (DAS) systems may also be used in combination with active transmitters and/or other noise measurements down-hole as various events may generate acoustic signatures.

The power harvesting device may be used as both an acoustic transmitter as well as an acoustic receiver and a pair of modules can then measure the gas fraction. A Doppler shift between these signals can also be used to measure the bulk volumetric flow. The Distributed Acoustic Sensing (DAS) system may also be used to track acoustic pulses transmitted from acoustic transmitter. This may be useful when the spacing between modules is large, or it can be used when low power acoustic pulses are transmitted.

It may be desirable to periodically change draw-down of the well, i.e. change the production rate, as this may generate various events that can be used to determine flow rates from the various inflow zones in the well.

It is well known in the prior art how multi-phase flow can be derived once these parameters are known.

Advantages of the Proposed System

The modularity of the proposed flow meters enables pay zones of any length and number to be monitored. The use of the vortex harvester has a dual use as a battery charger and a velocity measurement device.

The use of the electro acoustic technology assemblies in conjunction with the distributed acoustic transmission through the fiber optic cable is not limited by the number of sensors and additional electro acoustic technology sensors can be added for different purposes.

The flow meter mandrel proposed is simple and based on standard drill collars and can be molded in place, so the cost is significantly less than a machined collar.

Although certain embodiments and their advantages have been described herein in detail, it should be understood that various changes, substitutions and alterations could be made without departing from the coverage as defined by the appended claims. Moreover, the potential applications of the disclosed techniques are not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A system comprising:
   flow meter assemblies located between casing collars in a downhole production string; each flow meter comprising:
   an electro acoustic technology sensor assembly mounted on the outside of a section of production casing in close proximity to a fiber optic cable that is part of a fiber optic distributed acoustic sensing (DAS) system connected to a surface distributed acoustic sensing interrogator;
   a vortex energy harvester and velocity sensor on the inside of the section of production casing and located within a recess in a fixture attached to the collar of the section of the production casing;
   pressure and temperature sensors in the fixture attached to the collar of the section of the production casing; and
   a piezo electric transmitter in the electro acoustic technology sensor to transfer pressure, temperature, and velocity data to the fiber optic cable.

2. The system of claim 1 wherein the electro acoustic technology sensor comprises a piezo electric transmitter to transfer pressure, temperature, and velocity data to the fiber optic cable.

3. The system of claim 2 wherein the vortex energy harvester powers the electro acoustic technology sensor assembly.

4. The system of claim 2 wherein the vortex energy harvester and velocity sensor is a velocity sensor in which a frequency of vibration can be used to determine the velocity of the fluid in the casing.

5. The system of claim 1 wherein the electro acoustic technology sensor assembly comprises an internal rechargeable battery.

6. The system of claim 5 wherein the vortex energy harvester charges the internal rechargeable battery.

7. A method comprising:
   providing flow meter assemblies located between casing collars in a downhole production string; each flow meter providing:
   an electro acoustic technology sensor assembly mounted on the outside of a section of production casing in close proximity to a fiber optic cable that is part of a fiber optic distributed acoustic sensing (DAS) system connected to a surface distributed acoustic sensing interrogator;
   a vortex energy harvester and velocity sensor on the inside of the section of production casing and located within a recess in a fixture attached to the collar of the section of the production casing;
   pressure and temperature sensors in the fixture attached to the collar of the section of the production casing; and
   a transmitter in the electro acoustic technology sensor to transfer acoustic perturbations representing the pressure, temperature, and velocity data to the fiber optic cable;
   receiving and optically transferring the pressure, temperature, and velocity data perturbations measured by each of the flow meter assemblies through the fiber optic cable to the surface distributed acoustic sensing interrogator; and
   determining, from measured parameters, flow rate, density and oil-gas-water fraction from each zone.

8. The method of claim 7 wherein the transmitter in the electro acoustic technology sensor utilizes a piezo electric element.

9. The method of claim 7 wherein an established method of calculation comprises utilizing distributed acoustic sensing (DAS) with temperature and pressure data to determine a flow regime along a wellbore.

10. The method of claim 7 wherein an established method of calculation comprises estimating gas fraction by measuring an acoustic velocity in a fluid in the casing using distributed acoustic sensing (DAS) in combination with noise measurements downhole.

11. The method of claim 10 wherein active noise transmitters generate the noise measurements.

12. The method of claim 10 further comprising using the distributed acoustic sensing (DAS) system to track acoustic pulses transmitted from acoustic transmitters.

13. The method of claim 7 wherein an established method of calculation comprises utilizing alternate vortex harvester and velocity sensors as acoustic transmitters and acoustic sensors so that a pair of the vortex harvester and velocity sensors can measure gas fractions between the pair.

14. The method of claim 13 further comprising using a Doppler shift between alternate vortex harvester and velocity sensors to measure bulk volumetric flows.

15. The method of claim 7 wherein the vortex energy harvester provides a charge to an internal battery in the electro acoustic technology sensor assembly.

16. The method of claim 7 wherein the vortex energy harvester powers the electro acoustic technology sensor assembly.

17. The method of claim 7 wherein the vortex energy harvester and velocity sensor utilizes a frequency of vibration of the vortex energy harvester to determine the velocity of a flow within the casing.

* * * * *